Patented Feb. 25, 1941

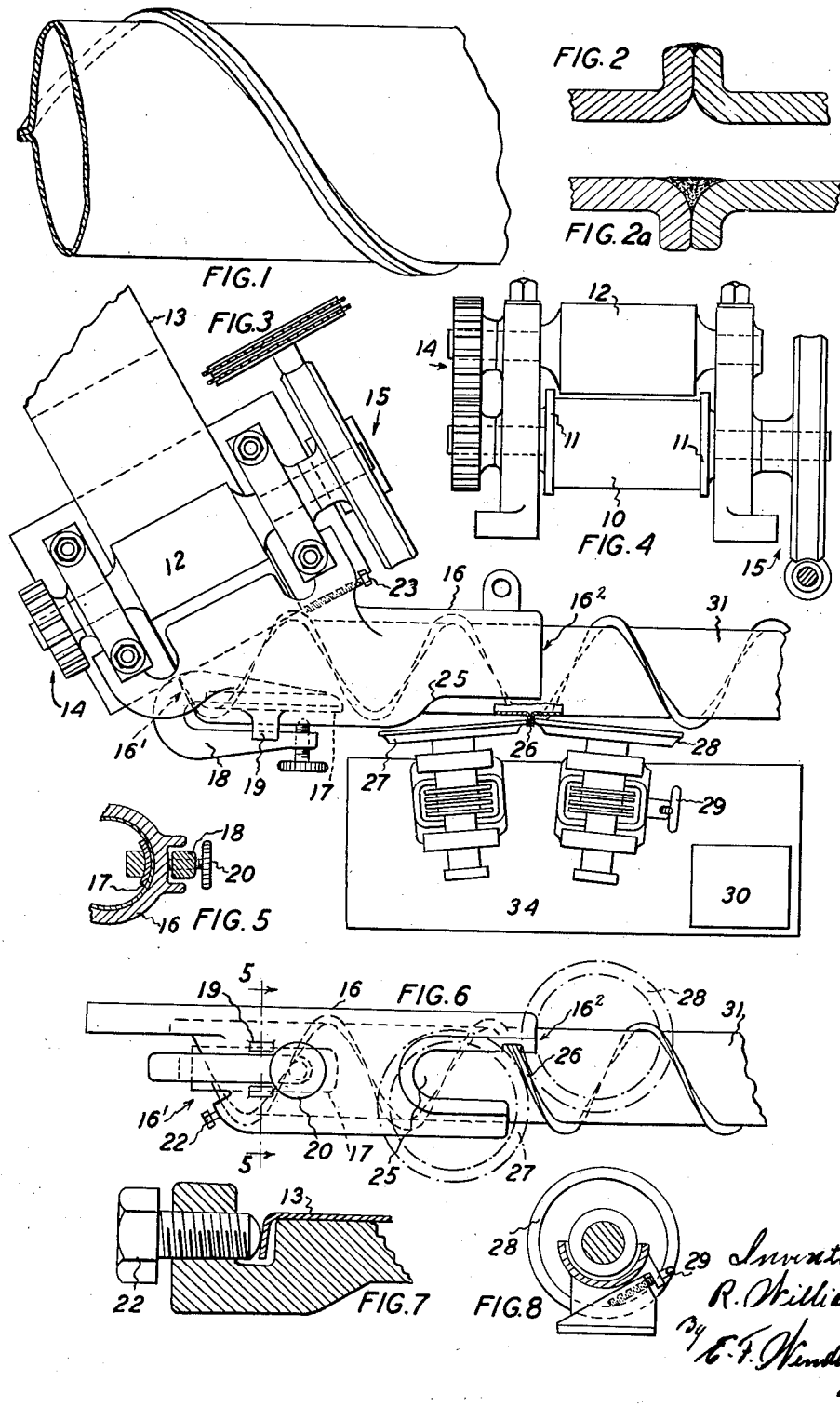

2,233,233

UNITED STATES PATENT OFFICE 2,233,233

MACHINE FOR HELICALLY COILING AND WELDING STRIP METAL TO FORM CONTINUOUS PIPES

Ralph Williams, Strathfield, near Sydney, New South Wales, Australia

Application July 8, 1939, Serial No. 283,508
In Australia February 2, 1939

3 Claims. (Cl. 219—6)

In conventional practice in the manufacture of helically welded pipes constructed of a continuous strip of metal, the strip is helically coiled and the joint edges are either lapped and riveted and caulked, or they are welded; in the case of thin sheet strip, the abutting edges are sometimes burred in order to facilitate torch welding of the joint. A lap and rivet joint is not favoured on account of the difficulty in making it sound and because also of the cost involved in the operation of making it, and a torch welded butt joint is not favoured because, particularly in the case of thin strip, it is inherently weak and liable to fracture if the pipe is subjected to distorting stresses, and also because of the liability of injury to the pipe wall by heat in the vicinity of the weld line.

Pipes produced in the machine of the present invention are formed by helically coiling a continuous strip of wrought steel, the edges of which have been flanged by upsetting them at right angles to the plane of the strip in the forming operation, and making the joint by electrically welding the abutting flanges together whilst they are maintained in close abutment during the forming operation in which the flanged strip is coiled helically. A joint of great strength and soundness formed in a helical rib around the pipe reinforces it and stiffens the pipe.

The invention applies to the case in which the strip is of metal plate as well as to the case in which the strip is of sheet metal. The flange joint may be external of the pipe wall or internally of the pipe wall.

The pipe is constructed by upsetting the side edges of a continuous strip of wrought steel, and thereafter in the same operation coiling it to form a pipe so that the flanges will abut and form a helical rib on the wall of the pipe thus formed. The abutting flanges are united by welding them continuously in the course of their progress through the forming machine. A more effective weld than an edge butt weld is thus ensured, and the welding heat being localised in the flanges does not extend (except to a negligible extent) to the wall portion of the pipe, and consequently risk of injury to the metal in the pipe body is minimised. The welded upset flanges form a helical stout reinforcement embracing the pipe wall and risk of failure at the joint line, which is to a greater or less extent a risk in the case of edge butt or burred edge welded joints, is substantially eliminated.

It is assumed that the metal shall be sufficiently clean surfaced for welding purposes. Its surfaces are rubbed clean in the edge flanging operation, and usually no special cleaning operation to prepare the joint faces of normally clean metal for welding is necessary.

In the coiling operation, close abutment of the flanged edges is enforced. They are held in the former in close contact in the vicinity of the welding position during the continuous welding operation.

When a resistance weld is used, it is formed by passing an electric current throuh the abutting flanges across the joint line from wheel or shoe contacts which bear oppositely against the exposed faces of the flanges. The amperage and voltage of the current required to produce the weld will vary according to the welding rate, the thickness of the flanges, and other factors, as is well known in electric welding practice.

In the case of externally helically flanged pipe with the joint closed by electric resistance welding the contacted flanges pass between two conductor wheels which are rotatably mounted in electrically insulated bearings and are pressed towards each other so that they tightly embrace the butted flanges between them as the butted flange passes between them during progress of the pipe through the former. These wheels are respectively connected to the terminals of an electric circuit. Optionally, other pairs of wheels may be provided for assisting in clamping the flanges together preceding and following the conductor wheel contacts, and for holding the freshly welded joint against risk of failure whilst the weld is in process of cooling.

Lengths of a strip sheet or plate strip are welded end to end to provide a continuous strip of indefinite length, the forming and welding operations being halted when each stock coil end is reached and whilst it is being welded to the starting end of another stock coil.

The helically welded pipe comes out of the forming and welding machine in a continuous length, and it is parted into lengths required for use, as by means of a floating saw, in the coure of its endwise movement after leaving the forming and welding machine.

In the case of a sheet strip pipe with the helical flange external on the pipe, it is preferred in all cases that the joint shall be made by electric resistance welding.

It is definitely advantageous to ensure that the flangings on the strip edges are quite flat and at right angles to the plane of the sheet, in order that the face abutment contact of the adjacent flanges will be true; straightness in the pipe and its circularity in section are thus assured and strength is not lost by reason of distortion in its shape.

When the edges of the strip are upset upwardly the jointed flange surrounds the pipe (see Figs. 1 and 2). But if they are upset downwardly (see Fig. 2a) the joint flanges will be within the pipe. In the latter case the joint is made by electric arc welding or by torch welding along the seam line on the outer side of the pipe as seen in Fig. 2a.

In the case of pipes produced from thin strip metal having good ductility, the edge flanges may be narrow enough to suffer contraction in the coiling operation so that they will butt evenly without frilling and when welded will form sound helical ribs on the interior face of the pipe in the case (see Fig. 2a) in which the strip is flanged downward. But in the case of harder metal or thicker metal in the strip which will not contract satisfactorily in the coiling operation, the strip edges are in a preliminary operation nicked or crimped at short intervals, so that the necessary take up will occur in the coiling operation.

The machine in which the flanging and coiling operations are performed comprises an assembly of a gang of feed and edge flanging rolls, a strickler which squares the flanges with respect to the flat of the strip, and a tubular former offset angularly from the roll gang. An helical slot in the tubular former provides access for welding, brazing, or soldering equipment. Friction of the formed pipe in its contact with the former interior surface during the coiling operates to cramp up the convolutions so that a close helical joint is formed, which, after welding, is held firmly for a sufficient time to ensure setting of the weld metal.

The machine and the pipe coming from it should be earthed and shielded as should also the spool from which the stock strip is taken into it to protect persons from accidental risks of dangerous or hurtful contacts.

Particularly when the plate strip is operated on, lubricant is supplied in the forming machine to minimise friction therein in the coiling operations.

In the accompanying drawing—

Fig. 1 is a side elevational view of a broken length of helical coil pipe, externally flange welded according to the present invention;

Fig. 2 is a fragmentary section through the welded external flange helical joint and adjacent parts of the wall of a pipe constructed of plate strip;

Fig. 2a is a fragmentary section through the flange joint of a pipe in which the helical flange is disposed inward of the pipe wall;

Fig. 3 is a top plan view of the machine;

Fig. 4 is an elevational view of feed and flanging rolls which form the primary element in the machine assembly;

Fig. 5 is a fragmentary detail section relating to a forming shoe in the coiling tube;

Fig. 6 is a side elevational view of the coiling tube, showing the forming shoe and the gap near its delivery end, where the welding is effected;

Fig. 7 is a fragmentary detail of an adjustable bending swage by which the flanged edges of the strip are set up square at their entry into the forming tube; and Fig. 8 is a sectional end elevational view of one of the rotary welding discs.

The lower roll 10 is shrouded (11), the shroud flanges and the roll face being spaced from the upper roll 12 by sufficient clearance to accommodate the stock strip of metal 13 which comes from a spool (not shown). The two rolls 10 and 12 are spur geared together (14) and the shrouded roll is driven by worm gear 15.

The rolls are disposed in angular relation to the forming tube 16. The degree of angle is varied according to the relation between the width of the flange edged strip and the diameter of the pipe to be produced. At its mouth 16' the tube 16 is slightly smaller in diameter than at its vent end $16^2$ and a longitudinally disposed shoe 17 is held within the mouth 16' by a yoke 18 the outer leg of which is located between lugs 19 and is fixed externally by a pinching screw 20. The flanged edge strip passes under the shoe 17 which is set with clearance for it, and it is guided by this shoe so as to prevent crowding, crumpling, or collapse as coiling movement commences in the course of progress of the strip through the forming tube.

To ensure squareness of the flanges, which otherwise would be liable to spread after the strip has left the nip of the rolls 10—12, two swaging screws 22, 23 are provided in the mouth of the forming tube; the ends of those screws bear inwardly on the flanges, as seen in Fig. 7 and square up the flanges as they rub past them.

The forming tube is in length about twice the width of one convolution in the coil into which the strip is curved in passing through the tube. A gap 25 is made near the vent end of the forming tube to provide clearance for engagement of the butted flanges 26 in the nip of two rotary welding discs 27, 28, between which the flanges roll as the coiled strip progresses outwardly through the tube. Those wheels are carried in insulating bearings and they are offset slightly (as seen in Fig. 3) for clearance, and the bearings which carry one of them are adjustable by a screw 29 to assure close contact of the peripheral edges of the discs with the respective sides of the butted flanges. These discs are rotated by frictional contact of the flange sides with them.

The discs 27, 28, are connected to the output terminals of a transformer 34 and interrupter 30, through which electric current is supplied in pulsations. Interruption of the current in rapid intervals is advantageous, but it is not essential. The abutted flanges are fusion welded by the current as they pass through the nip of the discs, and the weld cools and solidifier immediately. The completed welded pipe 31 proceeds continuously out of the tube in a quite straight length, and is subsequently parted into convenient lengths.

The operation of the machine is suspended before the back end of the metal strip has reached the rollers 10—12, whilst the starting end of another metal strip is welded on, when it is required to produce pipe in a long continuous length. Otherwise, when a reel of metal strip is exhausted, a fresh reel is inserted in its place; in that case the length of the pipe produced is limited by the length of strip on the reel from which the strip is taken by the rollers 10—12.

What is claimed is:
1. In a pipe making machine the combination comprising a tubular former, a pair of feed rollers whereby a metal strip is thrust tangentially and angularly into said former so that said strip is coiled helically within said former, shrouds on the ends of one of said feed rollers whereby the longitudinal edges of said strip are rectangularly flanged, said former coiling said strip with its flanges abutted and protruding radially outwardly from said coiled strip, and a pair of wheel electrodes disposed externally of said coiled strip and positioned close to the exit end of said former whereby the said abutted flanges are resistance welded together prior to leaving said former.

2. In a pipe making machine the combination comprising a tubular former, a pair of feed rollers whereby a metal strip is thrust tangentially and angularly into said former so that said strip is coiled helically within said former, shrouds on the ends of one of said feed rollers whereby the longitudinal edges of said strip are rectangularly flanged, said former coiling said strip with its flanges abutted and protruding radially outwardly from said coiled strip and a pair of wheel electrodes having peripheral welding faces disposed externally of said coiled strip and positioned close to the exit end of said former whereby the said abutted flanges are resistance welded together prior to leaving said former.

3. In a pipe making machine the combination comprising a tubular former, a pair of feed rollers whereby a metal strip is thrust tangentially and angularly into said former so that said strip is coiled helically within said former, shrouds on the ends of one of said feed rollers whereby the longitudinal edges of said strip are rectangularly flanged, said former coiling said strip with its flanges abutted and protruding radially outwardly from said coiled strip, a shoe fixer within the entry end of said former for guiding said strip, flange squaring members in the entry end of said former, and a pair of wheel electrodes disposed externally of said coiled strip and positioned close to the exit end of said former whereby the said abutted flanges are resistance welded together prior to leaving said former.

RALPH WILLIAMS.